June 18, 1935.  C. W. WEISS  2,005,444
TRANSMISSION
Filed March 13, 1934
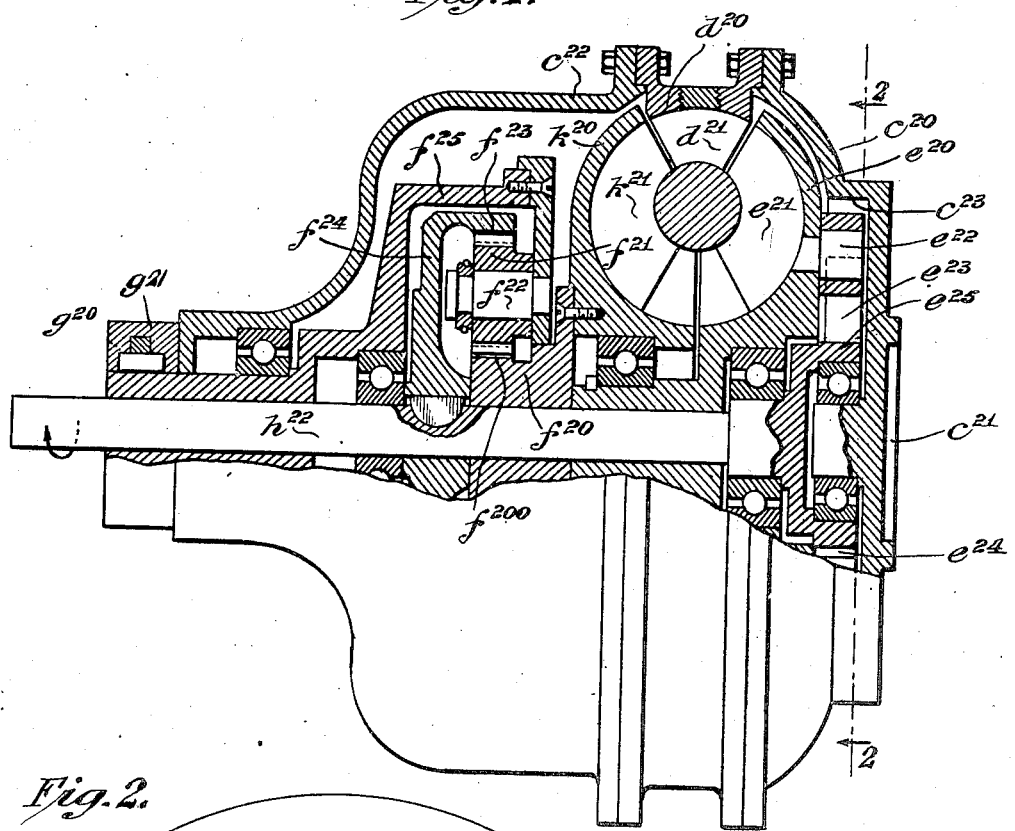
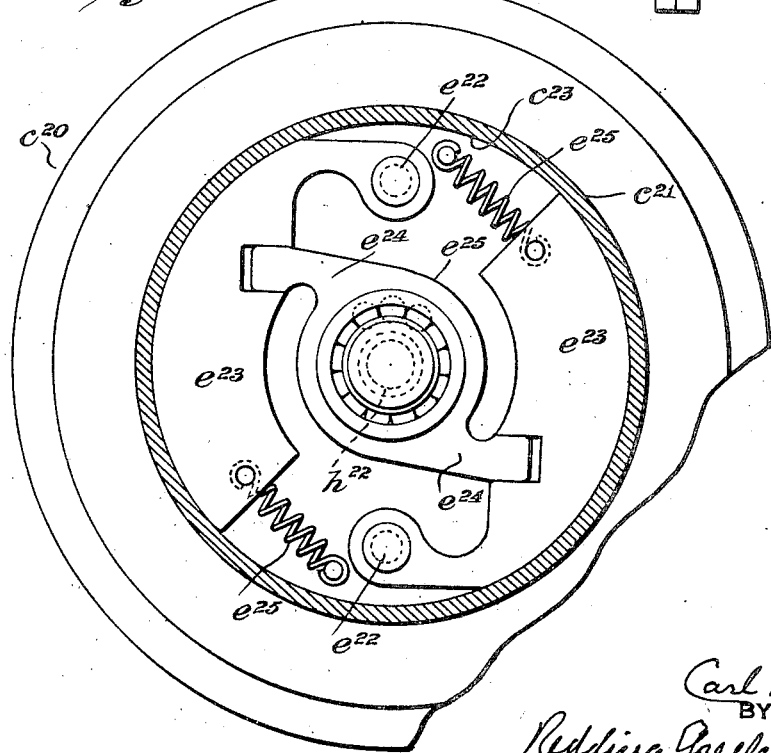
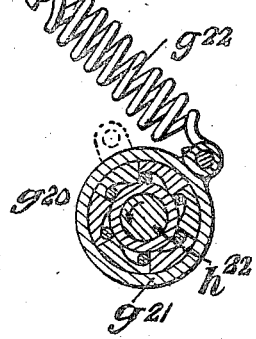
INVENTOR
Carl W. Weiss
BY
Redding, Greeley, O'Shea & Campbell
ATTORNEYS Patented June 18, 1935

2,005,444

UNITED STATES PATENT OFFICE 2,005,444

TRANSMISSION

Carl W. Weiss, Brooklyn, N. Y.

Application March 13, 1934, Serial No. 715,257

3 Claims. (Cl. 74—293)

It has been the object of the present invention to provide, between the driving shaft and the driven shaft of a variable speed transmission, especially as designed for transmission from the motor to the driven wheels of an automobile, a booster or torque multiplying device automatically responsive to variations in driving shaft speed and in driven shaft resistance, so that in starting from a condition of rest the driving shaft torque, as transmitted to the driven shaft, shall be multiplied automatically, through a positive acting drive, so that the speed of the driven shaft shall be increased gradually until the speed ratio between the driving shaft and the driven shaft gradually approaches the ratio of 1:1 or whatever ratio shall have been predetermined. The invention will be explained herein as applied to a variable speed hydraulic transmission of the general character of that shown in Letters Patent of the United States No. 1,921,014, August 8, 1933, but as this description proceeds it will be seen that the invention is capable of application in connection with transmissions of other types. It will be understood that in the application of the booster to a hydraulic transmission of the type shown the maximum motor torque effect is developed after the speed of the gasoline motor, used as the prime mover, begins to decline by reason of increased resistance. With increase in speed of the prime mover when resistance of the driven shaft decreases the torque transmitted by the hydraulic transmission increases until, in the division of torque between the hydraulic transmission and the booster, the hydraulic transmission takes all the load.

In the accompanying drawing in which the invention is illustrated—

Figure 1 is a view, partly in elevation and partly in section, of a transmission in which the invention is embodied.

Figure 2 is a view in transverse section on the plane indicated by the broken line 2—2 of Figure 1.

Figure 3 is a view, partly in elevation and partly in transverse section, on a smaller scale, illustrating particularly the provisions for enabling the relatively stationary member of the one-way clutch associated with the booster gearing to yield and thereby to cushion shocks when the wheels of an automobile meet obstructions on the road surface.

In the embodiment of the invention shown in Figures 1 and 2 the construction of the hydraulic transmission device is substantially like that shown in said Letters Patent No. 1,921,014, the driving member, to which power may be applied from any suitable source, being shown as a part $c^{21}$ of the housing $c^{20}$ which thus rotates about the axis of the transmission. In this instance the impeller $d^{20}$ with its vanes $d^{21}$ forms a part of the housing, being secured between the two parts $c^{20}$ and $c^{22}$ thereof. The liquid, in its vortical movement set up by the impeller, acts upon the vanes $e^{21}$ of the rotor $e^{20}$ and reacts upon the blades $k^{21}$ of a reaction rotor $k^{20}$. The rotor $e^{20}$ carries studs $e^{22}$ on which are mounted centrifugal weights $e^{23}$ which act through arms $e^{24}$ of a flange or hub $e^{25}$ formed on or secured to the driven shaft $h^{22}$. The weights $e^{23}$ are drawn normally toward the axis of the transmission, but by the action of centrifugal force, when the speed of rotation of the rotor $e^{20}$ is sufficiently great, fly out against the internal rim $c^{23}$ of the member $c^{21}$ and so couple the member $c^{21}$ of the housing directly to the driven shaft $h^{22}$ through the studs $e^{22}$, the weights $e^{23}$ and the arms $e^{24}$. At the same time the rotor $e^{20}$ is also coupled directly to the impeller $d^{20}$ and the housing. The arms $e^{24}$ are suitably shaped to enter recesses in the weights $e^{23}$ with such looseness as will permit slight relative movement. The reaction rotor $k^{20}$ carries one of the members of an epicyclic, booster gearing which, in the construction shown, is of the planetary type. In such construction the reaction rotor $k^{20}$ has secured thereto a sleeve or hub $f^{20}$ which has secured thereto or formed therewith a gear $f^{200}$ which constitutes one member of the epicyclic gearing; the intermediate member of such epicyclic gearing is, in the present instance, a gear $f^{21}$ which is mounted on a stud $f^{22}$ and engages an internal gear $f^{23}$ formed on or with a cupped disc $f^{24}$ which is keyed to the driven shaft $h^{22}$. The stud $f^{22}$ is carried by a suitably shaped member $f^{25}$ which is supported on the driven shaft $h^{22}$ and is permitted to rotate in one direction while held from rotation in the opposite direction by a one-way clutch of ordinary construction shown at $g^{20}$. In order to provide for the cushioning of shocks which, in the application of the invention to an automobile, might be transmitted to the road surface through the automobile wheels the relatively stationary member $g^{21}$ of the one-way clutch $g^{20}$ is preferably connected, as shown in Figure 3, by a spring $g^{22}$ to a fixed point $g^{23}$ on the stationary frame.

In the operation of the embodiment of this invention the impeller in starting up at low speed is rotated with the housing and sets up vortical movement of the liquid between the vanes of the rotor $e^{20}$ and the reaction rotor $k^{20}$, starting rotation of the rotor and of the reaction rotor when the resistance is not greater than the gear ratio of the planetary gearing. The gear $f^{200}$ rotates with the reaction rotor $k^{20}$ and, through the booster, imposes multiplied torque on the driven shaft $h^{22}$. As the speed of rotation increases the percentage of load borne by the booster decreases while the percentage of load carried by the rotor $e^{20}$ and applied directly to the driven shaft $h^{22}$ is increased until the load is shifted from the booster to the rotor and eventually as the speed of the rotor approaches its maximum the entire load is transferred from the driving member to the driven member through the action of the centrifugal weights $e^{23}$.

Assuming that torque is imposed on the rotor $e^{20}$ in a clockwise direction and on the reaction rotor $k^{20}$ in a counterclockwise direction and that thereby torque is imposed on the driven shaft $h^{22}$ through the epicyclic gearing, and assuming further that resistance is offered to the forward rotation of the driven shaft the resistance offered by the arms $e^{24}$ of the driven shaft causes the centrifugal weights to remain in their normal position out of contact with the driving surface $e^{23}$ of the rotating housing. The coiled springs $e^{25}$ applied to the centrifugal weights do not function in the operation but are provided for the purpose of holding the weights normally out of contact with the driving surface. As the speed of the impeller and the associated parts increases and the resistance offered by the driven shaft is overcome the weights, revolving about the axis of the transmission, tend to fly out into contact with the driving surface, overcoming the action of the coiled springs and the effect of the resistance offered by the driven shaft. When the speed increases sufficiently to bring about strong frictional contact between the weights and the driving surface then the rotor, carried with the revolving weights rotates with the housing at a 1:1 ratio.

It will be seen that the epicyclic booster gearing is not necessarily of the planetary gearing type shown and also that the variable speed transmission device, shown for convenience in explanation of the nature of the invention as an hydraulic transmission device, is not necessarily of the type shown. It will be understood that various changes in details of construction and arrangement can be made to suit different conditions of use or the convenience of the manufacturer, and that, except as pointed out in the accompanying claims, the invention is not restricted to the particular constructions shown and described herein.

I claim as my invention:

1. In combination, a driving member, a driven member, a variable speed transmission device having an impeller member, a rotor member, a reaction rotor member, the impeller member being in operative relation with the driving member, the rotor member being in operative relation with the driven member, and a booster gearing having one member in operative relation with the reaction rotor member and another member in operative relation with the driven member.

2. In combination, a driving member, a driven member, a variable speed transmission device having an impeller member, a rotor member, a reaction rotor member, the impeller member being in operative relation with the driving member, the rotor member being in operative relation with the driven member, and a booster planetary gearing having a sun gear carried with the reaction rotor member, an internal gear in operative relation with the driven member, an intermediate planet gear in engagement with the sun gear and the internal gear, and means to support the intermediate planet gear with freedom to revolve about the axis of the transmission.

3. In combination, a driving member, a driven member, a variable speed transmission device having an impeller member, a rotor member, a reaction rotor member, the impeller member being in operative relation with the driving member, the rotor member being in operative relation with the driven member, a booster gearing having one member in operative relation with the reaction rotor member, another member in operative relation with the driven member and an intermediate member, a one-way clutch having one member in operative relation with said intermediate member and a relatively stationary member, and yielding means to hold the relatively stationary member from rotation.

CARL W. WEISS.